(12) United States Patent
Kameda et al.

(10) Patent No.: US 8,148,473 B2
(45) Date of Patent: Apr. 3, 2012

(54) SULFUR-CONTAINING CONJUGATED DIOLEFIN COPOLYMER RUBBER, AND RUBBER COMPOSITION COMPRISING THE SAME

(75) Inventors: Yoshihiro Kameda, Hiratsuka (JP); Makoto Ashiura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 59 days.

(21) Appl. No.: 12/667,274

(22) PCT Filed: Jun. 11, 2008

(86) PCT No.: PCT/JP2008/061070
§ 371 (c)(1),
(2), (4) Date: Dec. 30, 2009

(87) PCT Pub. No.: WO2009/004918
PCT Pub. Date: Jan. 8, 2009

(65) Prior Publication Data
US 2010/0179280 A1    Jul. 15, 2010

(30) Foreign Application Priority Data
Jul. 3, 2007  (JP) .................................. 2007-175388

(51) Int. Cl.
*C08C 19/20*    (2006.01)
(52) U.S. Cl. .................. 525/343; 525/326.1; 525/328.3; 525/342; 556/427

(58) Field of Classification Search ............... 525/326.1, 525/328.3, 342, 343; 556/427
See application file for complete search history.

(56) References Cited

U.S. PATENT DOCUMENTS
6,518,335 B2 *  2/2003  Reedy et al. .................... 524/82

FOREIGN PATENT DOCUMENTS

| | | |
|---|---|---|
| JP | 2000-178378 | 10/1999 |
| JP | 2001-114817 | 10/1999 |
| JP | 2003-268041 | 3/2002 |
| JP | 2004-182894 | 12/2002 |
| JP | 2003-268041 | * 9/2003 |
| WO | WO2007/132909 | 11/2007 |

* cited by examiner

*Primary Examiner* — Ling-Siu Choi
(74) *Attorney, Agent, or Firm* — Thorpe North & Western LLP

(57) ABSTRACT

Disclosed is a sulfur-containing conjugated diolefin copolymer rubber composed of a conjugated diolefin and an aromatic vinyl compound, wherein (1) the content of sulfur bound to the rubber is 0.01 mmol % or more, (2) the content of the aromatic vinyl compound polymerization unit is not less than 5 wt % and less than 45 wt % relative to the amount of the copolymer rubber, and (3) the content of a vinyl bond (a 1,2-bond) in the conjugated diolefin polymerization unit is 30 mol % or more relative to the amount of the conjugated diolefin polymerization unit. In the copolymerization between the conjugated diolefin and the aromatic vinyl compound, a sulfur-containing polymerization terminator is used to terminate the reaction of the copolymerization.

12 Claims, No Drawings

SULFUR-CONTAINING CONJUGATED DIOLEFIN COPOLYMER RUBBER, AND RUBBER COMPOSITION COMPRISING THE SAME

PRIORITY CLAIM

Priority is claimed to PCT Patent Application WO 2009/004918 A1 filed on Jan. 8, 2009 which claims priority to Japan Patent Application Serial No. JP2007-175388 filed on Jul. 3, 2007, both of which are incorporated herein by reference in their entirety.

TECHNICAL FIELD

The present invention relates to a copolymer rubber composed of a conjugated diolefin and an aromatic vinyl compound, and to a rubber composition containing this copolymer rubber. More specifically, the present invention relates to a sulfur-containing conjugated diolefin based copolymer rubber and a rubber composition containing this copolymer rubber, wherein wear resistance, fracture resistance, and low hysteresis loss are balanced.

BACKGROUND TECHNOLOGY

In conjunction with demand for improved fuel economy for automobiles in recent years, there has been demand for conjugated diolefin based rubber as a rubber material for tires that provides low rolling resistance, wear resistance, excellent fracture properties, as well as steering stability. Previously known technologies include Japanese Unexamined Patent Application H12-178378. This technology increases compatibility between the conjugated diene-based polymer and silica, and increases silica dispersibility, by adding a modifying group that interacts with silica on the end of the polymer, specifically an amino group. However, this effect is not always sufficient and there is desire for further improvement.

SUMMARY OF THE INVENTION

Therefore, an objective of the present invention is to provide a conjugated diolefin based copolymer rubber that has favorable processability, and provides a balance between wear resistance, fracture properties, and low hysteresis loss.

The present invention provides a sulfur-containing copolymer rubber composed of a conjugated diolefin and an aromatic vinyl compound, wherein (1) the copolymer rubber polymer contains 0.01 mmol % or more of sulfur that is bound to the rubber, (2) the aromatic vinyl compound polymerization unit content is 5 weight % or more and less than 45 weight % based on the copolymer rubber, (3) a content of vinyl bonds (1, 2 bonds) in each conjugated diolefin polymerization unit is 30 mol % or more based on the conjugated diolefin polymerization units, and when copolymerizing the conjugated diolefin and the aromatic vinyl compound, the reaction is terminated using at least one type of compound selected from polymerization terminators with the following formulas (I) through (III):

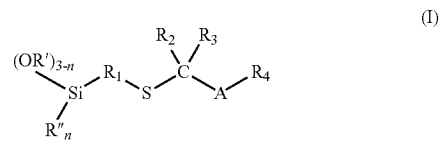

(wherein, n is between 0 and 2; R' and R" independently represent alkyl groups with between 1 and 4 carbon atoms; $R_1$ represents an alkylene group with between 1 and 8 carbon atoms; $R_2$, $R_3$ and $R_4$ independently represent hydrogen atoms, alkyl groups with between 1 and 18 carbon atoms, or cycloalkyl groups with between 3 and 10 carbon atoms, or phenyl groups; and A represents an oxygen atom or a sulfur atom.)

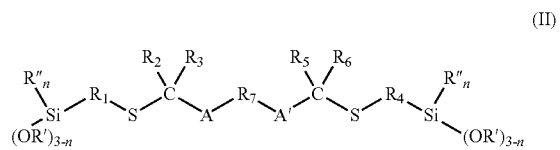

(wherein, n is between 0 and 2; R' and R" independently represent alkyl groups with between 1 and 4 carbon atoms; $R_1$ and $R_4$ independently represent alkylene groups with between 1 and 8 carbon atoms; $R_2$, $R_3$, $R_5$, and $R_6$ represent hydrogen atoms or alkyl groups with between 1 and 18 carbon atoms, or phenyl groups; $R_7$ represents an alkyl group between 1 and 10 carbon atoms, a cycloalkyl with between 3 and 10 carbon atoms, or a phenyl group; and A and A' represent oxygen atoms or sulfur atoms.)

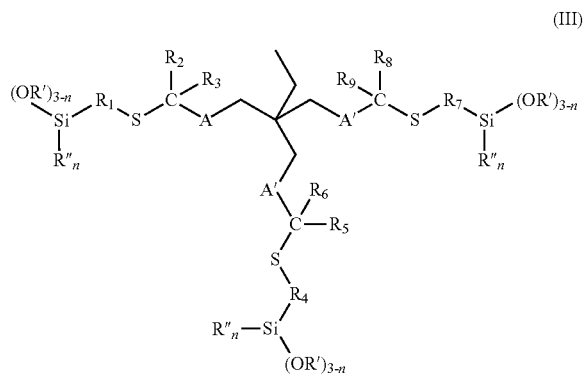

(wherein, n is between 0 and 2; R' and R" independently represent alkyl groups with between 1 and 4 carbon atoms; $R_1$, $R_4$ and $R_7$ independently represent alkylene groups with between 1 and 8 carbon atoms; $R_2$, $R_3$, $R_5$, $R_6$, $R_8$ and $R_9$ independently represent hydrogen atoms, or groups selected from alkyl groups with between 1 and 8 carbon atoms, or phenyl groups; and A, A', and A" independently represent oxygen atoms or sulfur atoms.)

The present invention can provide a rubber composition that has favorable processability and provides a balance between wear resistance, fracture properties, and low hysteresis loss, by using a copolymer rubber of an aromatic vinyl compound and a sulfur-containing conjugated diolefin expressed by the aforementioned formulas (I), (II) and/or (III).

DETAILED DESCRIPTION

As a result of diligent research to resolve the aforementioned issues, the present inventors have succeeded in obtaining a conjugated diolefin based copolymer rubber with favorable processability and that provides a balance between wear resistance, fracture properties, and hysteresis loss, by copolymerizing a conjugated diolefin and an aromatic vinyl compound using the compounds expressed by formulas (I), (II), and/or (III) as a polymerization terminator.

In other words, the present invention can provide a sulfur-containing conjugated diolefin based copolymer rubber which is a copolymer rubber composed of a conjugated diolefin and an aromatic vinyl compound, and (1) is a copolymer rubber polymer where the amount of sulfur bound to the rubber is 0.01 mmol % or more, and preferably between 0.03 and 1 mmol %,
(2) the amount of aromatic vinyl compound polymerization units is 5 weight % or more and less than 45 weight %, preferably in a range between 15 and 37 weight %, relative to the copolymer rubber,
(3) the amount of vinyl bonds in the conjugated diolefin polymerization units (1, 2 bonds) is 30 mol % or more, preferably 35 mol % or more, and more preferably in a range between 35 and 78 mol %, relative to the polymerization units of the conjugated diolefin, and when polymerizing the copolymer rubber composed of the conjugated diolefin and the aromatic vinyl compound, the reaction is terminated using a compound as expressed by the aforementioned formulas (I), (II), and/or (III) as a polymerization terminator.

In the aforementioned formula (I), n is between 0 and 2 but is preferably 0; R' and R" independently represent alkyl groups with between 1 and 4 carbon atoms, but preferably represent an ethylene group; $R_1$ represents an alkylene group with between 1 and 8 carbon atoms, but preferably represents a propylene group; $R_2$, $R_3$, and $R_4$ independently represent hydrogen atoms, or a group selected from an alkyl group with between 1 and 18 carbon atoms, but preferably between 1 and 4 carbon atoms, a cycloalkyl group with between 3 and 10 carbon atoms, or a phenyl group. Furthermore, A represents an oxygen atom or a sulfur atom.

In the aforementioned formula (II), n is between 0 and 2; R' and R" independently represent alkyl groups with between 1 and 4 carbon atoms, but preferably propyl groups; $R_1$ and $R_4$ independently represent alkylene groups with between 1 and 8 carbon atoms, but preferably propyl groups; $R_2$, $R_3$, $R_5$ and $R_6$ independently represent hydrogen atoms or groups selected from alkyl groups with between 1 and 18 carbon atoms, but preferably between 1 and 4 carbon atoms or phenyl groups; $R_7$ represents an alkyl group with between 1 and 8 carbon atoms, a cycloalkyl group with between 3 and 8 carbon atoms, or a phenyl group; and A and A' independently represent oxygen atoms or sulfur atoms.

In the aforementioned formula (III), n is between 0 and 2, but is preferably 0; R' and R" independently represent alkyl groups with between 1 and 4 carbon atoms, but preferably with 2 carbon atoms; $R_1$, $R_4$ and $R_7$ independently represent alkylene groups with between 1 and 8 carbon atoms, but preferably propyl groups; $R_2$, $R_3$, $R_5$, $R_6$, $R_8$, and $R_9$ independently represent hydrogen atoms or groups selected from alkyl groups with between 1 and 8 carbon atoms, but preferably between 1 and 3 carbon atoms and a phenyl group; and A, A' and A" independently represent oxygen atoms or sulfur atoms.

The present invention provides a rubber composition containing 100 weight parts of a total rubber component containing 10 weight parts or more, but preferably between 20 and 100 weight parts of a sulfur-containing diolefin rubber, and between 20 and 120 weight parts but preferably between 30 and 110 weight parts of a reinforcing filler containing silica (preferably between 50 and 100 weight %).

With the aforementioned sulfur-containing conjugated diolefin based copolymer rubber containing the rubber composition according to the present invention, (1) the sulfur content is preferably not less than 0.01 mmol because the effect on the rubber cross-linking configuration will be minimal,
(2) the aromatic vinyl compound content is preferably not low because the rubber strength will be low, and is preferably not too high because hysteresis loss will increase, and
(3) the amount of vinyl bonds is preferably not too high because blending workability will deteriorate and is preferably not too low because the hysteresis loss will increase.

The amount of copolymer rubber is preferably not less than 10 weight parts relative to 100 weight parts of rubber component because the desired effects will not be obtained. The amount of reinforcing filler that is added is preferably not less than 20 weight parts because the rubber strength will be reduced, and conversely is preferably not higher than 120 weight parts because the blending properties will deteriorate. Higher amounts of silica in the reinforcing filler is preferable, but the fracture strength of the rubber will deteriorate and there is a possibility that other properties will deteriorate if excessive, so the amount is preferably between 55 and 95 weight %, more preferably between 60 and 95 weight %.

Examples of the rubber component of the rubber composition of the present invention include natural rubber (NR), isoprene rubber (IR), styrene butadiene copolymer rubber (SBR), butadiene rubber (BR), butyl rubber (IIR) (which can be modified either on the end or in the polymer chain with an epoxy group, hydroxy group, or carbonyl group, or the like), and EPDM and the like, but NR, SBR, BR, and IR are preferably used.

In addition to the aforementioned component, the rubber composition according to the present invention can also contain various types of additives that are commonly added for tires or for other rubber compositions, such as other reinforcing agents (fillers) like carbon black, vulcanizing and cross-linking agents, vulcanizing and cross-linking accelerators, various types of oils, antiaging agents, plasticizers, and the like. The additives may be blended in according to a general method and used in vulcanizing or cross-linking. The amounts of these additives may be made according to conventional general amounts so long as not to adversely affect the object of the present invention.

Examples

Examples will now be used to further explain the present invention, but the scope of the present invention is, of course, by no means limited to these Examples.

The reagents used in the synthesis example are as shown below.

Cyclohexane and styrene: Manufactured by Kanto Kagaku Co., Ltd. Used after dehydrating it using molecular sieve 4A and subjecting it to nitrogen gas bubbling.

Butadiene: Manufactured by Nippon Petrochemicals Co., Ltd. Used 99.3% pure butadiene after dehydrating it using molecular sieve 4A.

n-butyl lithium: Manufactured by Kanto Kagaku Co., Ltd. Used a 1.58 mol/L n-hexane solution.

1,1,4,4-tetramethyl ethylene diamine (TMEDA): Manufactured by Kanto Kagaku Co., Ltd. Used after dehydrating it using molecular sieve 4A and subjecting it to nitrogen gas bubbling.

Toluene: Dehydration grade product manufactured by Kanto Kagaku Co., Ltd. Used without modification.

Mercaptosilane (3-mercaptopropyltriethoxysilane): Product (Z6911) manufactured by Toray Dow Corning Silicone Co., Ltd. Used without modification.

Cyclohexyl vinyl ether: Manufactured by Nippon Carbide Industries Co. Inc. Used without modification.

Cyclohexane dimethanol divinyl ether: Manufactured by Nippon Carbide Industries Co. Inc. Used without modification.

Synthesis of Blocked Mercaptosilane (Compound 1)

119.2 g (0.5 mol) of mercaptosilane and 63.1 g (0.5 mol) of cyclohexyl vinyl ether were reacted for one hour at room temperature in the presence of a phosphate ester catalyst to produce compound 1 with the following formula, where the mercapto group is blocked by the vinyl ether.

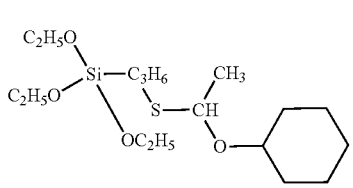

Compound 1

1H NMR (heavy chloroform) s (attribution, number of H):

0.7 (Si—$CH_2$ $^2$H), 1.1 to 1.5 (cyclohexyl $^{10}$H, —$OCH_3$ $^9$H), 1.7 ($CH_2$ $^2$H), 1.8 ($CH_3$ $^3$H), 2.6(S—$CH_2$, $^2$H), 3.5 (O-cyclohexylCH $^1$H), 3.6 to 3.8 (O—$CH_3$ $^6$H), 4.7 (O—CH $^1$H)

Synthesis of Blocked Mercaptosilane (Compound 2)

238.4 g (1.0 mol) of mercaptosilane and 98.2 g (0.5 mol) of cyclohexane dimethanol divinyl ether were reacted for 3 hours at room temperature in the presence of a phosphate ester catalyst to produce compound 2 with the following formula, where the mercapto group is blocked by the vinyl ether.

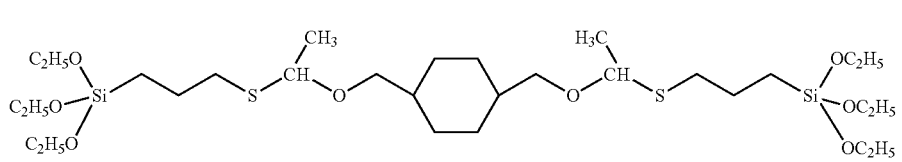

Compound 2

1H NMR (heavy chloroform) s (attribution, number of H):
0.7 (Si—$CH_2$ $^4$H), 1.1 to 1.9 (cyclohexyl $^{10}$H, $OCH_3$, $^{18}$H)
1.7 ($CH_2$ $^4$H), 1.8 ($CH_3$ $^6$H), 2.6 (S—$CH_2$, $^4$H)
3.2 to 3.6 (O—$CH_2$ $^4$H),
3.6 to 3.8 (O—$CH_2$ $^{12}$H), 4.7 (O—CH $^2$H)

Synthesis of Blocked Mercaptosilane (Compound 3)

Compound 3 was obtained by reacting 357.6 g (1.5 mol) of mercaptosilane and 118 g (0.5 mol) of trimethylol propane trivinyl ether (manufactured by Nippon Carbide Industries Co., Inc.) for 8 hours at room temperature in the presence of a phosphate ester catalyst F.

1H NMR (heavy chloroform) s (attribution, number of H)
0.7 (Si—$CH_2$, $^6$H), 0.9 ($CH_2$—$CH_3$, $^3$H), 1.5 (C—$CH_2$, $^2$H)
1.7 ($CH_2$ $^6$H), 1.8 ($CH_3$, 9H), 2.6 (S—$CH_2$, $^6$H)
3.2 to 3.4 (C—$CH_2$, $^6$H), 3.6 to 3.8 (O—$CH_2$, $^{18}$H), 4.7 (O—CH, $^3$H)

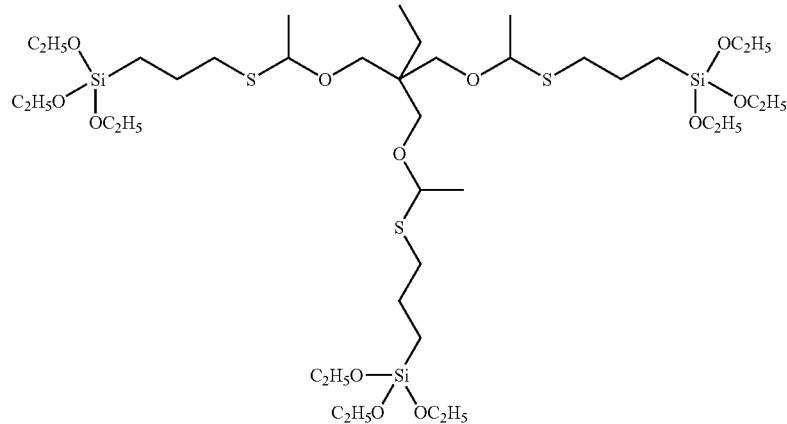

Compound 3

Example 1

4533 g of cyclohexane, 167.4 g of styrene (1.607 mol), 634.4 g (11.73 mol) of butadiene, and 1.030 mL (7.196 mmol) of TMEDA were added to an autoclave reaction vessel with an internal volume of 10 L that had been purged with nitrogen gas, and then mixing was started. After the temperature of the contents in the reaction vessel reached 50° C., 3.883 mL (6.915 mmol) of n-butyllithium was added, and after the polymer conversion ratio reached 100%, 1.428 g (3.920 mmol) of compound (I) was added and mixed for 1 hour. Next, 0.5 mL of methanol was added and mixed for 30 minutes. A small quantity of an antiaging agent (Irganox 1520) was added to the polymer solution obtained, and then the solvent was removed by vacuum concentrating. The polymer was coagulated in methanol, washed, and then dried to obtain solid polymer.

After $^1$H NMR measurement, the microstructure of the polymer obtained contained 22.0 weight % of styrene and 64.3% of vinyl. Furthermore, after measuring with GPC (calculated as polystyrene, effluent: THF), the molecular weight was Mn 347,000, Mw 471,000, and Mw/Mn 1.36.

Example 2

A reaction was performed similarly to example 1, and then 2.635 g (3.920 mmol) of compound 2 was added to obtain a polymer. After $^1$H NMR measurement, the microstructure of the polymer obtained contained 23.1 weight % of styrene and 64.9% of vinyl. Furthermore, after measuring with GPC (calculated as polystyrene, effluent: THF), the molecular weight was Mn 351,000, Mw 482,000, and Mw/Mn 1.37.

Example 3

A reaction was performed similarly to example 1, and then 36.35 g (3.920 mmol) of compound 3 was added to obtain a polymer. After $^1$H NMR measurement, the microstructure of the polymer obtained contained 25.6 weight % of styrene and 68.2% of vinyl. Furthermore, after measuring with GPC (calculated as polystyrene, effluent: THF), the molecular weight was Mn 363,000 Mw 494,000, and Mw/Mn 1.36.

Examples 4 to 6 and Comparative Examples 1 and 2

Preparation of Sample

With the formulation shown in Table I, the components other than the vulcanized accelerator and the sulfur were kneaded for 6 minutes using a 1.8 L sealed mixer, and then released once the temperature reached 155±5° C. to obtain a master batch. The vulcanization accelerator and the sulfur were kneaded into the master batch by an oven roller to obtain the rubber composition. Using this rubber composition, the unvulcanized physical properties were evaluated using the test method shown below. The results are shown in Table I as an index with the value of comparative example 1 as 100.

Next, the rubber composition obtained was vulcanized for 30 minutes at 150° C. in a 15×15×0.2 cm mold and a mold for Lambourn wear (diameter 63.5 mm, thickness 5 mm, disk shape) to provide a vulcanized rubber sheet, and the physical properties of the vulcanized rubber were measured using the test method shown below. The results are shown in Table I with the value of comparative example 1 as 100.

Rubber Properties Evaluation Test Method

Vulcanization time: The time until 95% vulcanization at 150° C. was measured based on JIS (Japanese Industrial Standard) K6300

Cross-linking density: The one hour vulcanization curve at 150° C. based on JIS K6300 was drawn and the value of ($M_H$-$M_L$) was taken as the cross-linking density.

100% modulus (M100): The modulus at 100% elongation was measured based on JIS K6251.

Fracture strength (TB): Measured in conformance with JIS K6251.

Fracture elongation (EB): Measured in conformance with JIS K6251.

Elastic modulus (60° C.): E' was measured at 60° C. with a static distortion of 10%, a dynamic distortion of ±2%, and a frequency of 20 Hz, using an viscoelastic spectrometer manufactured by Toyo Seiki Seisakusho.

Loss tangent (60° C.): tan δ was measured at 60° C. with a static distortion of 10%, a dynamic distortion of ±2%, and a frequency of 20 Hz, using and a viscoelastic spectrometer manufactured by Toyo Seiki Seisakusho.

Wear resistance: The wear resistance was measured using a disk shaped sample with a load of 39 N and a slip ratio of 50% in conformance with JIS K6264 using a Lambourn wear tester.

TABLE I

|  | Comparative example 1 | Comparative example 2 | Example 4 | Example 5 | Example 6 |
|---|---|---|---|---|---|
| Formulation (weight parts) | | | | | |
| Polymer of Example 1 | — | — | 100 | — | — |
| Polymer of Example 2 | — | — | — | 100 | — |
| Polymer of example 3 | — | — | — | — | 100 |
| NS116 *$^1$ | 100 | 100 | — | — | — |
| Silica *$^2$ | 60 | 60 | 60 | 60 | 60 |
| Carbon black *$^3$ | 5 | 5 | 5 | 5 | 5 |
| Stearic acid *$^4$ | 2 | 2 | 2 | 2 | 2 |
| Zinc white *$^5$ | 2 | 2 | 2 | 2 | 2 |
| Coupling agent *$^6$ | 4.8 | 4.8 | 4.8 | 4.8 | 4.8 |
| Aroma oil *$^7$ | 8 | 8 | 8 | 8 | 8 |
| Sulfur *$^8$ | 1.7 | 1.71 (Note 3) | 1.7 | 1.7 | 1.7 |
| CBS *$^9$ | 2 | 2 | 2 | 2 | 2 |
| DPG *$^{10}$ | 1.5 | 1.5 | 1.5 | 1.5 | 1.5 |
| Physical properties | | | | | |
| Vulcanization time (Note 1) | 100 | 100 | 97 | 97 | 96 |
| Degree of cross-linking (Note 2) | 100 | 100 | 111 | 116 | 117 |
| M100 (Note 2) | 100 | 100 | 103 | 105 | 104 |
| TB (Note 2) | 100 | 100 | 99 | 101 | 106 |
| EB (Note 2) | 100 | 100 | 100 | 99 | 101 |
| Elasticity Modulus (60° C.) (Note 2) | 100 | 100 | 102 | 105 | 107 |
| Loss tangent (60° C.) (Note 1) | 100 | 100 | 95 | 96 | 98 |
| Wear resistance (Note 2) | 100 | 100 | 99 | 102 | 104 |

(Note 1) Smaller values are better
(Note 2) Larger values are better
(Note 3) Comparative example 2 simply has increased sulfur content, but there is no change even with this level of increased sulfur.

Table I Notes
*$^1$ NS116 manufactured by Zeon Corporation (NMP terminal modified SBR (styrene content 23.9 weight %, vinyl content 69.9%)) (Note: Commercial product synthesized by the methods disclosed in Japanese patents #2,705,668, #2,705,669, and #2,705,670)
*$^2$ Nipseal AQ manufactured by Tosoh Silica
*$^3$ N234 grade manufactured by Tokai Carbon
*$^4$ Beads stearin manufactured by NOF Corporation
*$^5$ Zinc oxide type 3 manufactured by Seido Chemical Industry Co., Ltd.
*$^6$ S169 manufactured by Degussa
*$^7$ Process X-140 manufactured by Japan Energy
*$^8$ Oil treated sulfur manufactured by Hosoi Chemical Industry
*$^9$ Vulcanization accelerator CZ-G manufactured by Ouchi Shinko Chemical Industrial
*$^{10}$ Vulcanization accelerator D-G manufactured by Ouchi Shinko Chemical Industrial

Example 7 and Comparative Example 3

Preparation of Sample

With the formulation shown in Table II, the components other than the vulcanized accelerator and the sulfur were kneaded for 6 minutes using a 1.8 L sealed mixer, and then released once the temperature reached 155±5° C. to obtain a master batch. The vulcanization accelerator and the sulfur were kneaded into the master batch by an oven roller to obtain the rubber composition. Using this rubber composition, the unvulcanized physical properties were evaluated using the aforementioned test methods. The results are shown in Table II as an index with the value of comparative example 3 as 100.

Next, the rubber composition obtained was vulcanized for 30 minutes at 150° C. in a 15×15×0.2 cm mold and a mold for Lambourn wear (diameter 63.5 mm, thickness 5 mm, disk shape) to provide a vulcanized rubber sheet, and the physical properties of the vulcanized rubber were measured using the aforementioned test methods. The results are shown in Table II with the value of comparative example 3 as 100.

TABLE II

|  | Comparative example 3 | Example 7 |
|---|---|---|
| Formulation (weight parts) | | |
| Polymer of example 1 | — | 10 |
| Nipol 1721 (Oil extender 37.5 weight parts) *1 | 137.5 | 123.75 |
| Silica *2 | 60 | 60 |
| Carbon black *3 | 5 | 5 |
| Stearic acid *4 | 2 | 2 |
| Zinc white *5 | 2 | 2 |
| Coupling agent *6 | 4.8 | 4.8 |
| Aroma oil *7 | 8 | 18 |
| Sulfur *8 | 1.7 | 1.7 |
| CBS *9 | 1.5 | 1.5 |
| Total oil content (weight parts) | 45.5 | 45.5 |
| Physical properties | | |
| Vulcanization time (Note 1) | 100 | 97 |
| Degree of cross-linking (Note 2) | 100 | 100 |
| M100 (Note 2) | 100 | 100 |
| TB (Note 2) | 100 | 102 |
| EB (Note 2) | 100 | 100 |
| Elasticity Modulus (60° C.) (Note 2) | 100 | 102 |
| Loss tangent (60° C.) (Note 1) | 100 | 98 |
| Wear resistance (Note 2) | 100 | 101 |

(Note 1) Smaller values are better
(Note 2) Larger values are better

Table II Notes
*1 Nipol 1721 Made by Zeon Corporation (Amount of oil extender 37.5 weight parts, terminal unmodified SBR (styrene content 41.1 weight %, vinyl content 13.6%))
*2 Zeosil 1165MP manufactured by Rhodia
*3 Seast V manufactured by Tokai Carbon
*4 Bead stearic acid manufactured by NOF Corp.
*5 Zinc oxide type 3 manufactured by Seido Chemical Industry Co., Ltd.
*6 S169 manufactured by Degussa
*7 Process X-140 manufactured by Japan Energy
*8 Oil treated sulfur (5% oil treatment) manufactured by Hosoi Chemical Industry
*9 Vulcanization accelerator CZ-G manufactured by Ouchi Shinko Chemical Industrial
*10 Vulcanization accelerator D-G manufactured by Ouchi Shinko Chemical Industrial

Example 8 and Comparative Example 4

Preparation of Sample

With the formulation shown in Table III, the components other than the vulcanized accelerator and the sulfur were kneaded for 6 minutes using a 1.8 L sealed mixer, and then released once the temperature reached 155±5° C. to obtain a master batch. The vulcanization accelerator and the sulfur were kneaded into the master batch by an oven roller to obtain the rubber composition. Using this rubber composition, the unvulcanized physical properties were evaluated using the aforementioned test methods. The results are shown in Table III as an index with the value of comparative example 4 as 100.

Next, the rubber composition obtained was vulcanized for 30 minutes at 150° C. in a 15×15×0.2 cm mold and a mold for Lambourn wear (diameter 63.5 mm, thickness 5 mm, disk shape) to provide a vulcanized rubber sheet, and the physical properties of the vulcanized rubber were measured using the aforementioned test methods. The results are shown in Table III with the value of comparative example 4 as 100.

TABLE III

|  | Comparative Example 4 | Example 8 |
|---|---|---|
| Formulation (weight parts) | | |
| Polymer of example 2 | — | 50 |
| Nipol 1721 (Oil extender 37.5 weight parts) *1 | 68.5 | 68.5 |
| NS116 *2 | 50 | — |
| Silica *3 | 110 | 110 |
| Carbon black *3 | 10 | 10 |
| Stearic acid *4 | 2 | 2 |
| Zinc white *5 | 2 | 2 |
| Coupling agent *3 | 8.8 | 8.8 |
| Aroma oil *3 | 15 | 15 |
| Sulfur *3 | 1.7 | 1.7 |
| CBS *3 | 2 | 2 |
| DPG *3 | 1.5 | 1.5 |
| Physical properties | | |
| Vulcanization time (Note 1) | 100 | 100 |
| Degree of cross-linking (Note 2) | 100 | 104 |
| M100 (Note 2) | 100 | 103 |
| TB (Note 2) | 100 | 102 |
| EB (Note 2) | 100 | 100 |
| Elasticity Modulus (60° C.) (Note 2) | 100 | 103 |
| Loss tangent (60° C.) (Note 1) | 100 | 96 |
| Wear resistance (Note 2) | 100 | 103 |

(Note 1) Smaller values are better
(Note 2) Larger values are better

Table III Notes
*1 Nipol 1721 manufactured by Zeon Corporation (Amount of oil extender 37.5 weight parts, terminal unmodified Styrene-Butadiene Rubber (SBR) (styrene content 24.9 weight %, vinyl content 74.7%)).
*2 Refer to the notes for Table I
*3 Refer to the notes for Table II

INDUSTRIAL APPLICABILITY

As shown by the examples, the present invention can provide a rubber composition with excellent processability, high rubber reinforcement properties, low loss tangent (60 degrees Celsius), which is an indicator of rolling resistance, and excellent wear resistance, and therefore is useful as a tire material cap tread or the like.

What is claimed is:

1. A sulfur-containing copolymer rubber composed of a conjugated diolefin and an aromatic vinyl compound, wherein:
   (1) the copolymer rubber contains 0.01 mmol % or more of sulfur that is bound to the rubber,
   (2) the aromatic vinyl compound polymerization unit content is 5 weight % or more and less than 45 weight % relative to the amount of the copolymer rubber,
   (3) the content of a vinyl bond (1,2-bond) in the conjugated diolefin polymerization unit is 30 mol % or more relative to the amount of conjugated diolefin polymerization units, and when copolymerizing the conjugated diolefin and the aromatic vinyl compound, the reaction is terminated using at least one type of a compound selected from polymerization terminators with the following formulas (I) through (III):

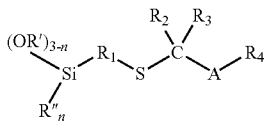

(I)

wherein, n is between 0 and 2; R' and R" independently represent alkyl groups with between 1 and 4 carbon atoms; $R_1$ represents an alkylene group with between 1 and 8 carbon atoms; $R_2$, $R_3$ and $R_4$ independently represent hydrogen atoms, alkyl groups with between 1 and 18 carbon atoms, or cycloalkyl groups with between 3 and 10 carbon atoms, or phenyl groups; and A represents an oxygen atom,

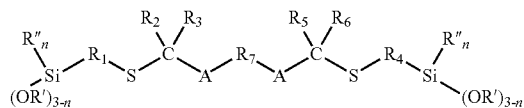

(II)

wherein, n is between 0 and 2; R' and R" independently represent alkyl groups with between 1 and 4 carbon atoms; $R_1$ and $R_4$ independently represent alkylene groups with between 1 and 8 carbon atoms; $R_2$, $R_3$, $R_5$, and $R_6$ independently represent hydrogen atoms, alkyl groups with between 1 and 18 carbon atoms, or phenyl groups; $R_7$ represents an alkylene group between 1 and 10 carbon atoms, or a cycloalkylene with between 3 and 10 carbon atoms, or a phenylene group; and A and A' represent oxygen atoms,

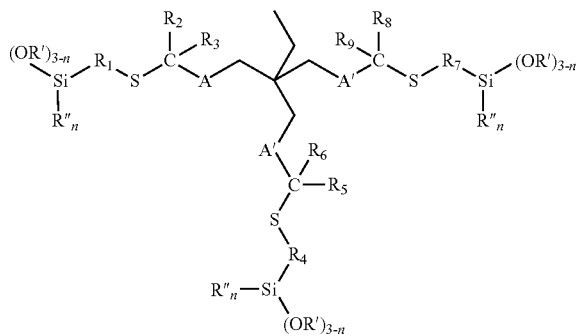

(III)

wherein, n is between 0 and 2; R' and R" independently represent alkyl groups with between 1 and 4 carbon atoms; $R_1$, $R_4$ and $R_7$ independently represent alkylene groups with between 1 and 8 carbon atoms; $R_2$, $R_3$, $R_5$, $R_6$, $R_8$ and $R_9$ independently represent hydrogen atoms, or groups selected from alkyl groups with between 1 and 8 carbon atoms, or phenyl groups; and A, A', and A" independently represent oxygen atoms.

2. A copolymer rubber according to claim 1, wherein the content of a vinyl bond (1,2-bond) in the conjugated diolefin polymerization unit is 35 mol % or more relative to the amount of conjugated diolefin polymerization units.

3. A copolymer rubber according to claim 1, wherein the content of a vinyl bond (1,2-bond) in the conjugated diolefin polymerization unit is between 35 mol % and 78 mol % relative to the amount of conjugated diolefin polymerization units.

4. A copolymer rubber according to claim 1, wherein the aromatic vinyl compound polymerization unit content is 15 weight % or more and less than 37 weight % relative to the amount of the copolymer rubber.

5. A copolymer rubber according to claim 1, wherein the copolymer rubber polymer contains between 0.03 mmol % and 1 mmol % of sulfur that is bound to the rubber.

6. A copolymer rubber according to claim 1, wherein n is 0.

7. A copolymer rubber according to claim 1, further comprising an additive selected from the group consisting of: carbon black, vulcanizing and cross-linking agents, vulcanizing and cross-linking accelerators, various types of oils, anti-aging agents, and plasticizers.

8. A rubber composition, comprising 100 weight parts of a rubber component containing 10 weight parts or more of the copolymer rubber according to claim 1, and between 20 and 120 weight parts of a reinforcement filler containing silica.

9. The rubber composition according to claim 8, wherein an amount of silica comprising the reinforcement filler is between 50 and 100 weight %.

10. The rubber composition according to claim 9, wherein the amount of silica comprising the reinforcement filler is between 55 and 95 weight %.

11. The rubber composition according to claim 9, wherein the amount of silica comprising the reinforcement filler is between 60 and 95 weight %.

12. A rubber composition, comprising 100 weight parts of a rubber component containing 10 weight parts or more of the copolymer rubber according to claim 1, and between 50 and 100 weight parts of a reinforcement filler containing silica.

* * * * *